United States Patent
Miyoji et al.

(10) Patent No.: US 6,228,814 B1
(45) Date of Patent: May 8, 2001

(54) CARBONACEOUS COMPOSITE MATERIAL AND SLIDING MEMBER USING THE SAME

(75) Inventors: Arai Miyoji; Miyatani Toshiyuki; Tojo Tetsuro; Murata Tadashi, all of Mitoyo-gun; Watanabe Nobuatsu, Nagaokakyo, all of (JP)

(73) Assignee: Toyo Tanso Co., Ltd., Osaka (JP)

( * ) Notice: Subject to any disclaimer, the term of this patent is extended or adjusted under 35 U.S.C. 154(b) by 0 days.

(21) Appl. No.: 09/495,358

(22) Filed: Feb. 1, 2000

(51) Int. Cl.⁷ .................................................. C10M 103/02
(52) U.S. Cl. ........................ 508/106; 508/109; 508/112; 508/129
(58) Field of Search .................................. 508/106, 109, 508/112, 129

(56) References Cited

U.S. PATENT DOCUMENTS

| | | | | |
|---|---|---|---|---|
| 3,717,576 | * | 2/1973 | Hiratsuka et al. | 508/106 |
| 3,776,845 | * | 12/1973 | Watanabe et al. | 508/106 |
| 4,333,977 | * | 6/1982 | Abrahams et al. | 508/106 |
| 4,626,365 | * | 12/1986 | Mori | 508/106 |
| 4,655,944 | * | 4/1987 | Mori | 508/106 |
| 5,089,154 | * | 2/1992 | King | 508/112 |

* cited by examiner

Primary Examiner—Jacqueline V. Howard
(74) Attorney, Agent, or Firm—Oblon, Spivak, McClelland, Maier & Neustadt, P.C.

(57) ABSTRACT

The present invention relates to a carbonaceous composite material that can fully produce the characteristic effect of the graphite fluoride containing carbonaceous composite material with a minimum additive ratio of graphite fluoride and simultaneously can produce the secondary corrosion inhibiting properties and to a sliding member using the same. The carbonaceous composite material of the present invention features in that it contains graphite fluoride; and alkaline agent for neutralization of hydrogen fluoride or adsorbent for fixation of hydrogen fluoride, the remainder being carbonaceous components. The sliding member of the invention is the one made by using the carbonaceous composite material of the invention. Specifically, the carbonaceous composite material of the invention is applicable to an electric sliding brush, a mechanical sealing member, a bearing member and the like.

26 Claims, 4 Drawing Sheets

CARBONACEOUS COMPOSITE MATERIAL AND SLIDING MEMBER USING THE SAME

BACKGROUND OF THE INVENTION

1. Field of the Invention

The present invention relates to a carbonaceous composite material excellent in abrasion resistance and self-lubricating properties and having secondary corrosion inhibiting properties and to a sliding member using the same.

2. Description of the Related Art

Carbonaceous composite materials, which are excellent in chemical resistance, heat resistance and machinability as well as in self-lubricating properties, are regarded with interests as sliding members, for example, and are widely used, including electric sliding brushes for generators (hereinafter they are simply referred to as "brush"); bearings for various kinds of devices; and mechanical sealing rings. Recently, the devices are often used in even more harsh conditions or extreme environmental conditions and, besides, are demanded for high reliability and life extension. To meet the demands, the carbonaceous composite materials are growing in development. One of the carbonaceous composite materials, which have developed as part of the development, is a carbonaceous composite material to which graphite fluoride is added. It is known that the addition of graphite fluoride can largely contribute to improvement of abrasion resistance and self-lubricating properties of the carbonaceous composite materials and is particularly preferable as the sliding members (Japanese Laid-open Patent Publication No. Sho 55-116609).

However, the brushes made from the carbonaceous composite material in which graphite fluoride was added have been found to have great problems when actually assembled in a motor to use them. Those are the problems that in use, a decomposed product of the graphite fluoride produced in the brush, i.e., fluorine, escapes out and reacts with moisture (water) in the air to thereby produce hydrofluoric acid, which in turn can produce detrimental effects. Specifically, not only the event that the produced hydrofluoric acid causes corrosion of a commutator (made of copper) of the motor to progress in a short time but also the so-called secondary corrosion of various kinds of metallic members around the brush being corroded gradually are caused.

In addition, the graphite fluoride is very much expensive, so manufacturing costs for the sliding members are largely influenced by even a few percent of variations of the additive ratio. For this reason, it is necessary to determine the limits on the additive ratio of graphite fluoride so that high sliding performance can be obtained with a minimum additive ratio, for production of the sliding members of cost efficiency.

In the light of the circumstances mentioned above, the present invention has been made. It is the objective of the present invention to attempt to provide (i) a carbonaceous composite material that can fully provide the characteristic effect of the graphite fluoride containing carbonaceous composite material with a minimum additive ratio of graphite fluoride and simultaneously can provide the secondary corrosion inhibiting properties and (ii) a sliding member using the same.

SUMMARY OF THE INVENTION

A carbonaceous composite material of the present invention features in that it comprises graphite fluoride; and alkaline agent for neutralization of hydrogen fluoride or absorbent for fixation of hydrogen fluoride, the remainder being carbonaceous components.

The sliding member of the invention is the one made by using the carbonaceous composite material of the invention. Specifically, the carbonaceous composite material of the invention is applicable to an electric sliding brush, a mechanical sealing member, a bearing member and the like.

The graphite fluoride is added to improve the sliding properties of the carbonaceous composite material. The alkaline agent for neutralization of hydrogen fluoride or the absorbent for fixation of hydrogen fluoride is added to suppress occurrence of the secondary corrosion resulting from fluorine which is the decomposed product of the graphite fluoride.

It is preferable that the content of the graphite fluoride is not more than 1.0 mass % in that the content of graphite fluoride exceeding 1.0 mass % can no longer produce any noticeable improvement in sliding properties.

Further, for removing the liberated fluorine from the graphite fluoride most efficiently, it is preferable that the content of the alkaline agent for neutralization of hydrogen fluoride or the content of adsorbent for fixation of hydrogen fluoride is substantially equal to the content of the graphite fluoride.

The alkaline agents for neutralization of hydrogen fluoride including at least one alkaline agent selected from the group consisting of oxides of alkali metals or alkaline earth metals and hydroxides. Particularly, the alkaline agents for neutralization of hydrogen fluoride is preferably at least one alkaline agent selected from the group consisting of lithium oxide, calcium oxide, lithium hydroxide and calcium hydroxide.

The adsorbents for fixation of hydrogen fluoride include at least one absorbent selected from the group consisting of fluorides of alkali metals or alkaline earth metals. Particularly, the adsorbent for fixation of hydrogen fluoride is preferably sodium fluoride.

DETAILED DESCRIPTION OF THE PREFERRED EMBODIMENTS

The carbonaceous composite material of the present invention is a carbonaceous composite material having a basic component containing graphite fluoride and alkaline agent for neutralization of hydrogen fluoride or adsorbent for fixation of hydrogen fluoride, the remainder being carbonaceous components. In addition, the sliding members of the present invention, including electric sliding brushes, mechanical sealing members and bearing members, are made by using the carbonaceous composite material of the present invention.

Preferably, the content of the graphite fluoride is not more than 1.0 mass %. The content of the graphite fluoride was determined in the following manner.

In order to find a carbonaceous composite material that can produce high sliding performance with a minimum additive ratio of graphite fluoride, the inventors first studied the relationship between the additive ratio of graphite fluoride and the brush wear rate, and then conducted the experiments, starting with the attempt for determining the upper limit of the additive ratio.

0 mass %, 0.2 mass %, 0.4 mass %, 0.8 mass %, 1.2 mass % and 1.6 mass % of graphite fluorides were each added to a raw material comprising 60 mass % of natural graphite, 20 mass % of epoxy resin and other curing agents or organic solvents, to produce 6 types of brushes. The brushes thus produced were fit in a cleaning motor and submitted to the sliding tests under conditions of the pressing pressure $P=0.04$ MPa and $P=0.13$ MPa and the number of rotation $V=48$ m/sec. (in common) for 100 hours. The results are shown in FIGS. 1 and 2.

Figure 1:
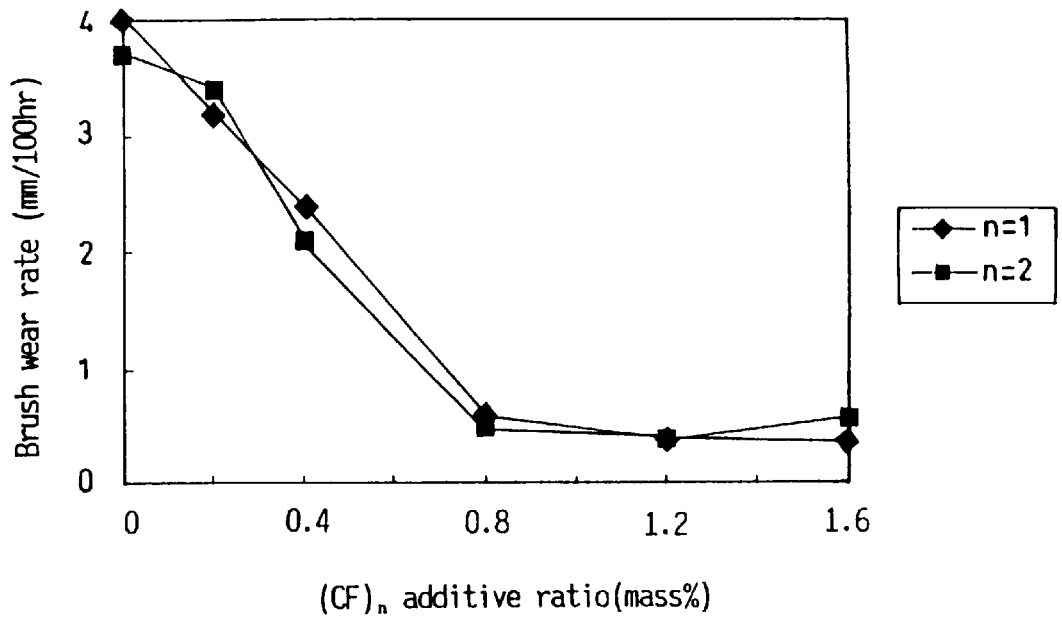
FIG. 1 is a diagram showing the relationship between the additive ratio of graphite fluoride and the brush wear rate.
Figure 2:
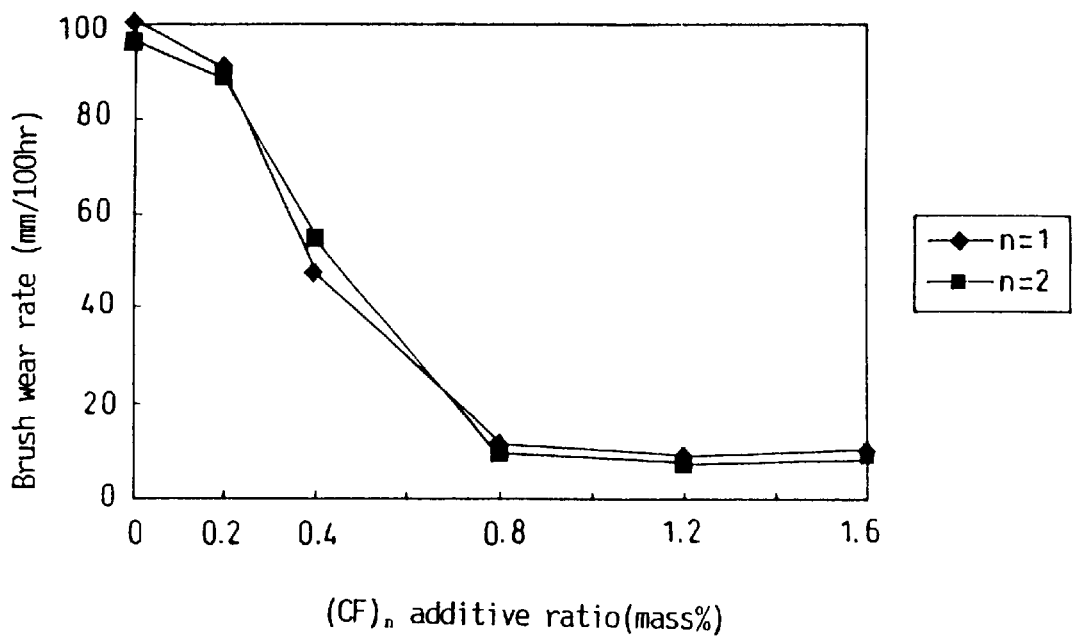
FIG. 2 is a diagram showing the relationship between the additive ratio of graphite fluoride and the brush wear rate under a condition different in pressing pressure from that of FIG. 1.

As seen from FIGS. 1 and 2, in either condition, the relationship between the additive ratio of graphite fluoride and the brush wear rate showed substantially the same tendency. The brush wear rate with 0.4 mass % of graphite fluoride was decreased to about one seconds of the brush wear rate with no addition of graphite fluoride. It was observed that the rate of decrease of the brush wear rate of the same reached about one tenths with the additive ratio of graphite fluoride exceeding 0.8 mass % and was generally stabilized at the level. It can be determined from the results that the upper limit of the additive ratio of graphite fluoride is of the order of 1.0 mass %, preferably, 0.8 mass %.

In the present invention, it is preferable that the content of the alkaline agent for neutralization of hydrogen fluoride or of the adsorbent for fixation of hydrogen fluoride is generally equal to the content of the graphite fluoride. The content of the alkaline agent for neutralization of hydrogen fluoride or of the adsorbent for fixation of hydrogen fluoride was determined as follows.

The electric sliding brushes produced with the additive ratio of 0.8 mass % of graphite fluoride (hereinafter it is called "the brush") were actually used to examine occurrence of the secondary corrosion resulting from fluorine which is a decomposed product of the graphite fluoride. Specifically, the brushes were set in the motor (actual machine) and then submitted to the sliding tests under conditions of the pressing pressure $P=0.04$ MPa and the number of rotations $V=48$ m/sec. for 100 hours. After the operation was stopped, the brushes were allowed to stand as they were, and it was then found that the commutator of the motor and the brushes were put into adhesion by corrosion in about three months.

To solve the problems, with the aim to adopt a method in which the fluorine, which is liberated from the graphite fluoride to be decomposed, is made unharmful by neutralizing it by use of alkaline agent or by fixing it by use of adsorbent, the inventors conducted further experiments for seeing if effective results could be produced by such a method and for determining the type and the additive ratio of alkaline agent or adsorbent to select. For those purposes, as a precondition for the addition of the alkaline agent or adsorbent, it is necessary to grasp the generating amount of fluorine with respect to the additive ratio of graphite fluoride and also obtain a guide for determination of the additive ratio of graphite fluoride used in the tests for determining the effects of the addition of the alkaline agent or adsorbent. Accordingly, the inventors first started with the tests for determining the relationship between the additive ratio of graphite fluorine and the generating amount of fluorine.

Figure 3:
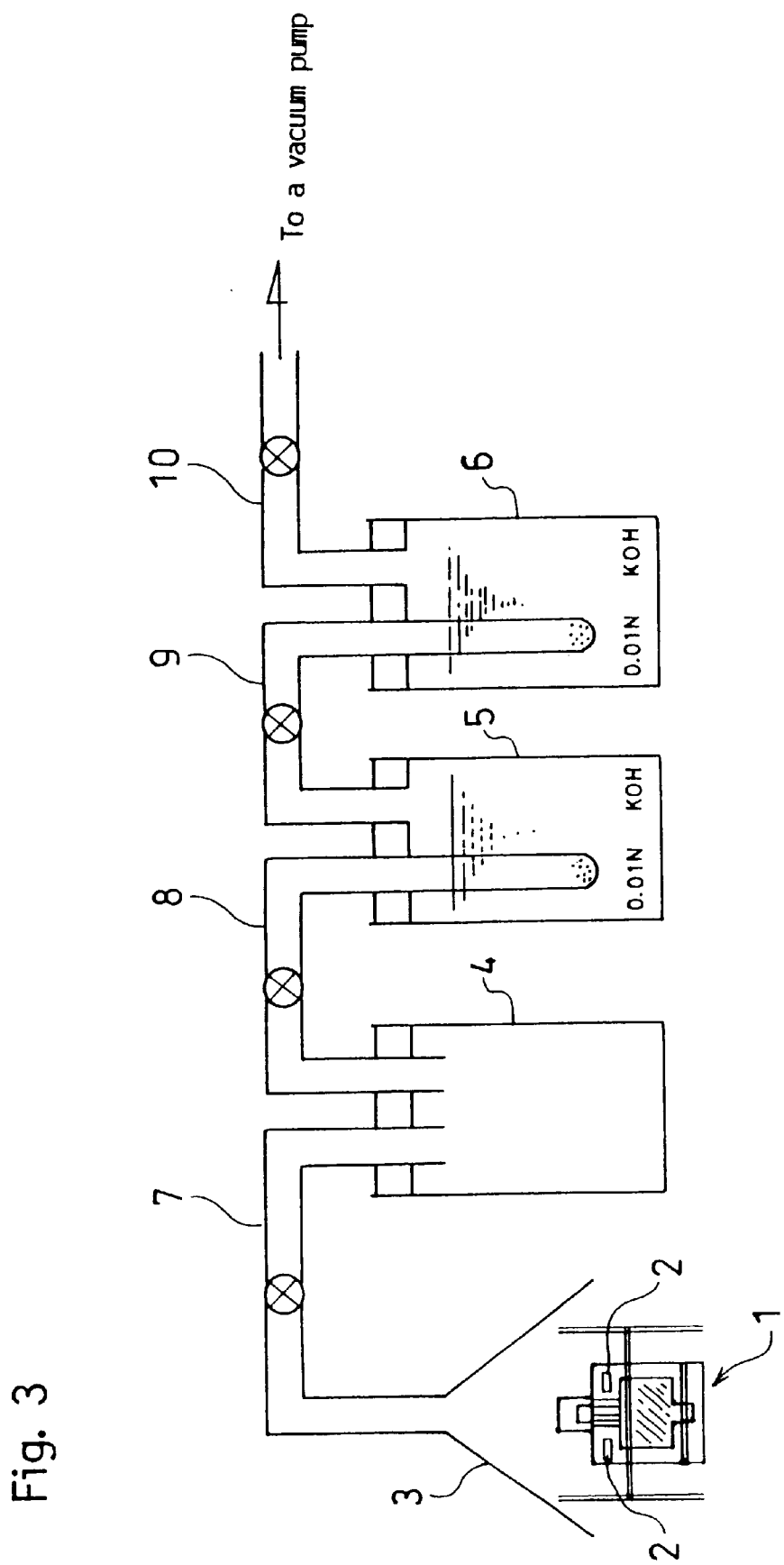
FIG. 3 is a schematic illustration of a liberated fluorine capturing apparatus.

0 mass %, 0.2 mass %, 0.4 mass %, 0.8 mass %, 1.2 mass % and 1.6 mass % of graphite fluoride were each added to produce 6 types of brushes. The brushes were each set in a liberated fluorine capturing apparatus shown in FIG. 3. Arrangements were made to capture the exhausted gas in a KOH solution of 0.01N (200 ml). In the diagram, 3 designate a hood for covering a top of the motor 1 fitting the brushes 2 therein. The hood 3, a spare bin 4 and first and second absorbing bins 5, 6 for capturing therein the fluorine in the exhausted gas are communicated to each other through pipes 7, 8 and 9. A pipe 10 is connected to a vacuum pump not shown at an end thereof. A quantitative analysis was performed on the fluorine in the solution in each of the first and second absorbing bins 5, 6 in which the liberated fluorine was captured, using an ion concentration meter having fluorine ion selective electrodes, and the total of the both values was defined as the concentration of fluorine in the exhausted gas.

The testing conditions were made much more rigorous than common operating conditions so that the values measured as the concentration of fluorine can be of the order more than 0.1 ppm (mg/l). Specifically, the intermittent operation was performed for 4 hours, running under conditions of the motor voltage $V=110V$, the pressing pressure $P=0.15$ MPa, and the number of rotation $V=48$ m/sec. for 2 minutes and coming to rest for 10 seconds. The relationship between the additive ratio of as-obtained graphite fluoride and the concentration of as-generated fluorine are shown in FIG. 4.

Figure 4:
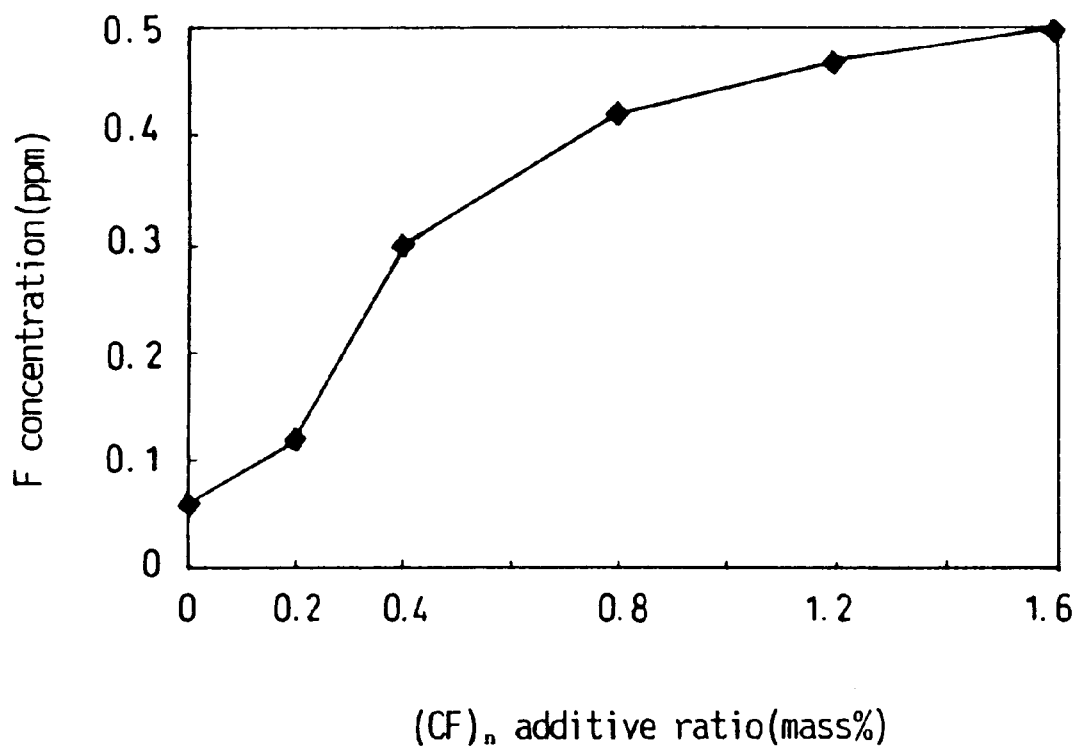
FIG. 4 is a diagram showing the relationship between the additive ratio of graphite fluoride and the concentration of fluorine.

As apparent from FIG. 4, 0.42 ppm of fluorine was detected with the additive ratio of 0.8 mass % of graphite fluoride, and 0.47 ppm of fluorine was detected with the additive ratio of 1.2 mass % of graphite fluoride. It can be said that this level of concentration of fluorine is enough for determining the effects resulting from the addition of the alkaline agent or adsorbent (the effects of removing the generated fluorine). Accordingly, the additive ratio of graphite fluoride in the tests on the addition of alkaline agents or adsorbents as mentioned later were determined to be set at 0.8 mass % and 1.2 mass %.

FIG. 4 shows that even when no graphite fluoride was added, fluorine as minute as about 0.06 ppm was detected. This is because since the testing conditions were rendered much more rigorous, minute quantities of fluorine existing as impurities in the natural graphite forming the brush body itself were detected. Accordingly, speaking of the graphite fluoride added brush, it can be said that if the concentration of fluorine can be reduced to a level of 0.06 ppm by the addition of the alkaline agent or adsorbent, the liberated fluorine resulting from the graphite fluoride is substantially removed by the neutralization or fixation. Conversely, it can be understood that the additive ratio of alkaline agent or adsorbent enough for the concentration of fluorine to reduce to the level of 0.06 ppm may be set as the maximum additive ratio.

Then, further tests on the addition of the alkaline agents or adsorbents (tests for determining the relationship between the additive ratio of alkaline agent or adsorbent and the reduced amount of concentration of fluorine) were conducted. First, 0.8 mass % of graphite fluoride and 0 mass %, 0.2 mass %, 0.4 mass %, 0.8 mass %, 1.2 mass % and 1.6 mass % of lithium hydroxide (LiOH) selected as the alkaline agent were respectively added to a raw material comprising 60 mass % of natural graphite, 20 mass % of epoxy resin and other curing agents or organic solvents, to produce 6 types of brushes. Thereafter, 24 types of brushes were produced, while changing the alkaline agents to lithium oxide ($Li_2O$), calcium oxide (CaO) and calcium hydroxide ($Ca(OH)_2$) one after another. Further, 6 types of brushes were produced, adding to the same raw material the graphite fluoride in the same amount and sodium fluoride (NaF) which is an adsorbent used as a substitute for the alkaline agent, while changing it in the same manner as the above. The 30 types of the produced brushes in total were submitted to the tests under the same conditions as in the tests for determining the relationship between the additive ratio of graphite fluoride and the generating amount of fluorine (the tests using the liberated fluorine capturing apparatus shown in FIG. 3), to determine the relationship between the additive ratio of alkaline agent or adsorbent and the reduced amount of the generated fluorine. The results are shown in FIG. 5.

Figure 6:
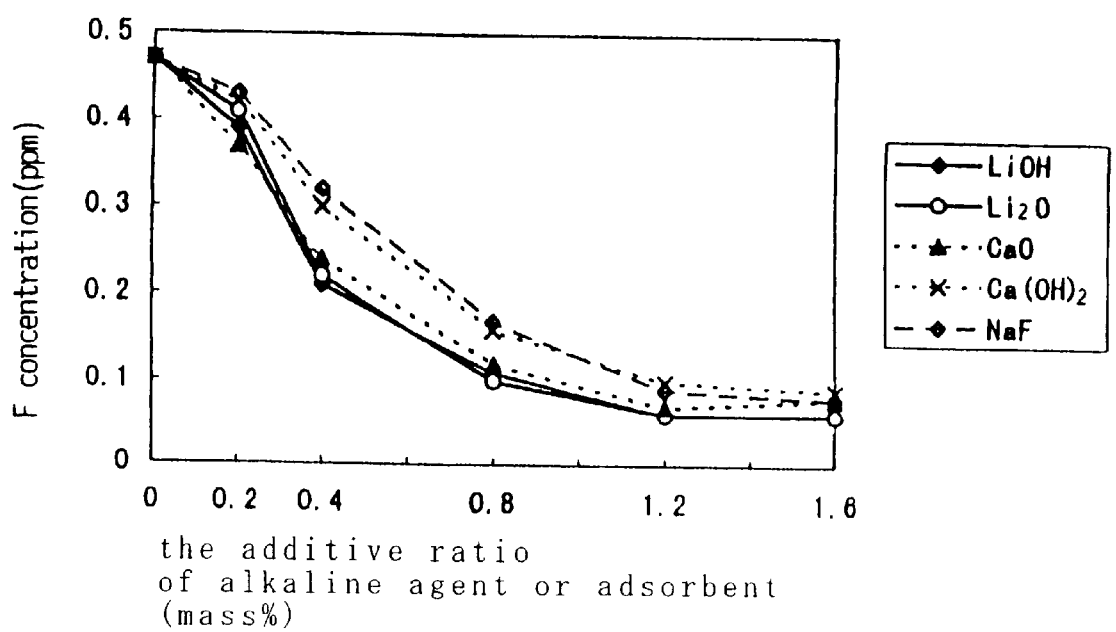
FIG. 6 is a diagram showing the relationship between the additive ratio of alkaline agent or adsorbent and the concentration of fluorine at 1.2 mass % of the additive ratio of graphite fluoride.

Further, additional 30 types of brushes were produced in the same manner, except the addition of 1.2 mass % of graphite fluoride, changing the conditions on the raw material, the alkaline agents and the adsorbents variously. These additional brushes were submitted to the same tests to determine the relationship between the additive ratio of alkaline agent or adsorbent and the reduced amount of the generated fluorine. The results are shown in FIG. 6.

Figure 5:
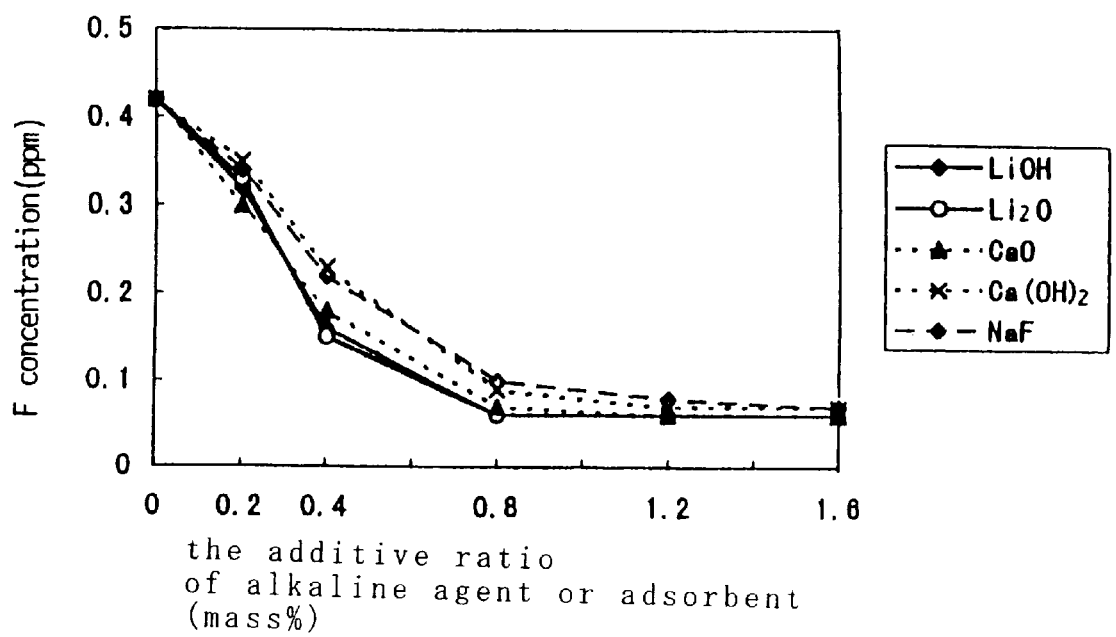
FIG. 5 is a diagram showing the relationship between the additive ratio of alkaline agent or adsorbent and the concentration of fluorine at 0.8 mass % of the additive ratio of graphite fluoride.

It can be seen from FIG. 5 that when the additive ratio of graphite fluoride is 0.8 mass %, the concentration of fluorine is reduced to the level of 0.06 ppm when the additive ratio of either of the alkaline agent and the adsorbent reaches the level of 0.8 mass %. Also, it can be seen from FIG. 6 that when the additive ratio of graphite fluoride is 1.2 mass %, the concentration of fluorine is reduced to the level of 0.06 ppm when the additive ratio of either of the alkaline agent and the adsorbent reaches the level of 1.2 mass %. It can be understood from these results that the addition of the alkaline agent or the adsorbent substantially equal in amount to the additive ratio of graphite fluoride produces the result of removing the liberated fluorine from the graphite fluoride most efficiently.

4 typical types of alkaline agents of lithium hydroxide (LiOH), lithium oxide ($Li_2O$), calcium oxide (CaO) and calcium hydroxide ($Ca(OH)_2$) used in the above the tests for determining the effects of the addition of the alkaline agent or adsorbent are taken as particularly preferable examples. At least one alkaline agent selected from the group consisting of oxides of alkali metals or alkaline earth metals and hydroxides may fully be used as the material that can basically produce the effects of removing the fluorine generation.

Also, sodium fluoride (NaF) which was used as one of the adsorbents is also taken as a particularly preferable example. As in the case with the alkaline agents, at least one adsorbent selected from the group consisting of fluorides of alkali metals or alkaline earth metals may also fully be used as the material that can basically produce the effects of removing the fluorine generation.

In the above illustration, reference is given to the electric sliding brushes which provide great significance particularly when using the typical carbonaceous composite material of the present invention, while it was confirmed that mechanical sliding members, such as mechanical sealing members and bearing members, provided similar effects.

As aforementioned, the present invention can provide a carbonaceous composite material excellent in abrasion resistance and self-lubricating properties and having secondary corrosion inhibiting properties and sliding members using the same under normal or lower pressure atmosphere. Particularly, the additive ratio of graphite fluoride of not more than 1.0 mass % or the additive ratio of alkaline agent or adsorbent of approximately equal to the additive ratio of graphite fluoride can provide more reliable abrasion resistance, self-lubricating properties and secondary corrosion inhibiting properties and, besides, can provide more economical carbonaceous composite material and sliding members using the same. Also, the application of the present invention to the brushes permits a limited addition of graphite fluoride, and as such can fully meet prescribed properties peculiar to the electric sliding members which are not involved in the mechanical sliding members.

Further, the present invention holds promise of significantly contributing to any fields in which the secondary corrosion resulting from the liberated fluorine produced by use of components made of graphite fluoride containing carbonaceous material may become a problem.

Tests (1) Preparation of carbonaceous composite material and production of sliding members made of the same material 0.8 mass % of graphite fluoride and 0.8 mass % of alkaline agent (LiOH), which is an amount effective for removing the liberated fluorine generated to the extend that is consistent with the additive ratio of graphite fluoride, were added to the raw comprising 60 mass % of natural graphite, 20 mass % of epoxy resin and other curing agents or organic solvents, and those were fully mixed to produce electric sliding brushes.

(2) Evaluation on performance properties of the sliding members (i) Secondary corrosion inhibiting properties Actual machine tests were conducted using the produced brushes. The actual machine tests were conducted under the same conditions as in the aforesaid secondary corrosion examining tests using no addition of alkaline agents. Specifically, the electric sliding brushes were set in the motor (actual machine) and then submitted to the sliding tests under conditions of the pressing pressure P=0.04 MPa and the number of rotation V=48 m/sec. for 100 hours. After the operation was stopped, the brushes were allowed to stand as they were, to examine the presence or absence of the secondary corrosion and the developing status. No adhesion was then found between the electric sliding brushes and the commutator of the motor even after five months after the brushes were allowed to stand. The visual inspection showed that both the electric sliding brushes and the motor remained unchanged from the early stage of operation and no traces of corrosion were observed.

(ii) Self-lubricant properties

In the actual machine tests, when the temperature of the sliding motor was measured after 50 hours from the start of the tests, it was 70° C.

On the other hand, when the temperature of the sliding motor using conventional type of brushes produced with no addition of graphite fluoride and alkaline agent was measured under the same conditions, it was 140° C. Thus, it was found that the brushes of the present invention permitted the temperature of the motor to reduce to one second, as compared with the conventional type ones. It can be understood from this fact that the inventive carbonaceous composite material and the sliding member using the same can produce further improvements in self-lubricating properties as well than the conventional type of carbonaceous composite material and the sliding member using the same.

(iii) Abrasion resistance

Tests to examine whether the abrasion resistance of the original effect of the sliding member to which the graphite fluoride was added was affected by the addition of alkaline agent or adsorbent were conducted together. The same sliding tests as in FIG. 1 were conducted for the produced electric sliding brushes. Specifically, the electric sliding brushes were fitted in the cleaning motor and then submitted to the sliding tests under conditions of the pressing pressure P=0.04 MPa and the number of rotation V=48 m/sec. for 100 hours. It was then found that similar results to the results (FIG. 1) of the sliding members to which 0.8 mass % of graphite fluoride was only added were obtained and their abrasion resistance was also well maintained.

In the above illustration of the present invention, the application of carbonaceous composite material mainly containing the graphite fluoride to the sliding members was taken an example. However, the application of the carbonaceous composite material of the present invention is not limited to the sliding members. The carbonaceous composite material of the present invention is effectively applicable to any fields in which the secondary corrosion resulting from the liberated fluorine produced in using components made of graphite fluoride containing carbonaceous material may become a problem.

Although the present invention has been described in its preferred embodiments, it is to be understood that the invention is not limited thereto and that various changes and modifications may be made without departing from the sprit and scope of the invention.

What is claimed is:

1. A composition comprising an epoxy resin, graphite, graphite fluoride and an alkaline agent which neutralizes hydrogen fluoride.

2. The composition of claim 1, wherein said alkaline agent and said graphite fluoride are present in substantially equal amounts.

3. The composition claim 1, wherein said alkaline agent is selected from the group consisting of alkali metal oxides, alkali metal hydroxides, alkali earth metal oxides and alkali earth metal hydroxides.

4. The composition of claim 3, wherein said alkaline agent is selected from the group consisting of lithium oxide, calcium oxide, lithium hydroxide, and calcium hydroxide.

5. The composition of claim 1, wherein said graphite fluoride is in an amount of not more than 1.0 mass %.

6. A composition comprising an epoxy resin, graphite, graphite fluoride and an adsorbent for fixation of hydrogen fluoride.

7. The composition of claim 6, wherein said adsorbent and said graphite fluoride are present in substantially equal amounts.

8. The composition of claim 6, wherein said absorbent is a alkali metal fluoride or an alkali earth metal fluoride.

9. The composition of claim 8, wherein said absorbent is sodium fluoride.

10. The composition of claim 6, wherein said graphite fluoride is in an amount of not more than 1.0 mass %.

11. A sliding member comprising the composition of claim 1.

12. A sliding member comprising the composition of claim 6.

13. An electric sliding brush comprising the composition of claim 1.

14. An electric sliding brush comprising the composition of claim 6.

15. A mechanical sealing member comprising the composition of claim 1.

16. A mechanical sealing member comprising the composition of claim 6.

17. A bearing comprising the composition of claim 1.

18. A bearing comprising the composition of claim 6.

19. A method of making a sliding member comprising forming the composition of claim 1 into said sliding member.

20. A method of making an electric sliding brush comprising forming the composition of claim 1 into said electric sliding brush.

21. A method of making a mechanical sealing member comprising forming the composition of claim 1 into said mechanical sealing member.

22. A method of making a bearing comprising forming the composition of claim 1 into said bearing.

23. A method of making a sliding member comprising forming the composition of claim 6 into said sliding member.

24. A method of making an electric sliding brush comprising forming the composition of claim 6 into said electric sliding brush.

25. A method of making a mechanical sealing member comprising forming the composition of claim 6 into said mechanical sealing member.

26. A method of making a bearing comprising forming the composition of claim 1 into said bearing.

* * * * *